United States Patent [19]
Mototani et al.

[11] Patent Number: 5,721,072
[45] Date of Patent: Feb. 24, 1998

[54] ALKALINE BATTERY

[75] Inventors: Yuji Mototani, Yawata; Yuri Kojima, Katano; Shigeto Noya, Neyagawa; Junichi Asaoka, Ikoma, all of Japan

[73] Assignee: Matsushita Electric Industrial Co., Ltd., Osaka-fu, Japan

[21] Appl. No.: 683,558

[22] Filed: Jul. 15, 1996

[30] Foreign Application Priority Data

Jul. 21, 1995 [JP] Japan .................................. 7-185795

[51] Int. Cl.⁶ .................................................. H01M 4/42
[52] U.S. Cl. ............................................ 429/229; 429/206
[58] Field of Search ..................................... 429/229, 206

[56] References Cited

U.S. PATENT DOCUMENTS

| | | | |
|---|---|---|---|
| 4,312,931 | 1/1982 | Witherspoon et al. | 429/229 |
| 4,332,871 | 6/1982 | Charkey | 429/229 |
| 4,592,974 | 6/1986 | Takeda et al. | 429/229 |
| 4,617,242 | 10/1986 | Dopp | 429/206 |
| 4,842,963 | 6/1989 | Ross, Jr. | |
| 4,857,424 | 8/1989 | Larsen et al. | 429/206 |
| 5,108,494 | 4/1992 | Uemura et al. | 429/206 |
| 5,240,793 | 8/1993 | Glaeser | 429/206 |
| 5,306,580 | 4/1994 | Mansfield, Jr. et al. | 429/175 |
| 5,419,987 | 5/1995 | Goldstein et al. | 429/220 |

FOREIGN PATENT DOCUMENTS

| | | |
|---|---|---|
| 0 048 009 - A1 | 3/1982 | European Pat. Off. . |
| 0 048 009 A 1 | 3/1982 | European Pat. Off. . |
| 0 555 978 A 1 | 8/1993 | European Pat. Off. . |
| 0 584 987 A1 | 11/1994 | European Pat. Off. . |
| 62-123657 (A) | 6/1987 | Japan . |
| 63-285868 | 11/1988 | Japan . |
| 63-285869 | 11/1988 | Japan . |
| 4-289661 (A) | 10/1992 | Japan . |
| 5-101824 (A) | 4/1993 | Japan . |
| A 05 086430 | 8/1993 | Japan . |
| A 06 223829 | 8/1994 | Japan . |

OTHER PUBLICATIONS

Linden, "Handbook of Batteries and Fuel Cells", McGraw-Hill Book Company, pp. 7-4 to 7-7 (no month available) 1984.

*Primary Examiner*—Stephen Kalafut
*Assistant Examiner*—Carol Chaney
*Attorney, Agent, or Firm*—Panitch Schwarze Jacobs & Nadel, P.C.

[57] ABSTRACT

An alkaline battery using a mercury free zinc alloy powder as an anode active material is disclosed. It has a gelled anode which comprises silicon and zinc alloy powder containing at least one of a) aluminum and b) calcium, c) bismuth in combination with calcium.

4 Claims, 1 Drawing Sheet

ALKALINE BATTERY

BACKGROUND OF THE INVENTION

1. Field of the Invention

The present invention relates to an alkaline battery, particularly to a gelled zinc alloy anode for alkaline batteries.

2. Description of the Prior Art

Amalgamated (mercury-containing) zinc alloy powders have heretofore been employed for an anode of an alkaline battery in order to suppress possible corrosion of the zinc powder as an anode active material of the alkaline battery and to maintain an acceptable storing property of the battery having such anode.

However, from the viewpoints of environmental preservation and protection from pollution, decreasing mercury content in the anode zinc alloy powder and commercialization of a battery including a non-amalgamated, mercury free zinc alloy powder have been demanded in recent years.

From various studies on a variety of non-amalgamated (mercury free) zinc alloy powders, it was found that a non-amalgamated zinc alloy powder added with any of bismuth, aluminum and calcium had an excellent corrosion-resistant property and suppressed the generation of gas due to the corrosion of the zinc powder. This zinc alloy powder is thus taken as a promising anode zinc material for the mercury free alkaline battery (See, Japanese Laid-Open Patent Publication No. Hei 5-86430).

However, if the alkaline battery including such non-amalgamated zinc alloy powder containing either one of bismuth, aluminum or calcium in the anode is subjected to a discharge with a specified load resistance or current, an extreme reduction may sometimes be observed in the discharge capacity of the battery. The cause of such extreme decrease is now clarified as follows: A dendrite-like zinc oxide having electron conductivity is formed during the discharge with a specified load resistance or current. The formed dendrite-like zinc oxide precipitates on a separator between the anode and cathode, and penetrates the separator, as a result of which an internal short-circuiting occurs between the anode and the cathode.

In order to prevent this internal short-circuiting, an effective measure is to make the distance between the cathode and the anode large by increasing the thickness of the separator. Another effective measure is to increase the shielding property of the separator by employing a thinner fiber for the separator, thereby to make the separator to have a more dense texture. The filling amount of the gelled zinc anode must however be decreased if the separator is made thicker, and the discharge capacity decreases with the decrease in the filling amount of the active material. If the separator has a more dense texture, the internal resistance of the battery increases, thereby to deteriorate the battery performance.

SUMMARY OF THE INVENTION

The primary object of the present invention is to provide an alkaline battery which effectively prevents the above-mentioned internal short-circuiting due to the formation of dendrite-like zinc oxide and has excellent discharge performance.

The alkaline battery in accordance with the present invention comprises a cathode terminal, a cathode mixture, a gelled zinc anode including a mercury free zinc alloy powder and a gelling agent, an anode current collector, a separator between the cathode and the anode, and an alkaline electrolyte. The zinc alloy powder contains at least one member selected from the group consisting of bismuth, aluminum and calcium. The gelled anode further includes silicon.

Incorporation of the silicon element in the anode helps suppression of the possible growth of the dendrite-like zinc oxide during discharging and also suppresses the decrease in the discharge capacity caused under specified conditions.

It is preferable that the content of silicon in the above-mentioned anode is 25–1,500 ppm by weight of the zinc alloy powder.

In one preferable mode of the present invention, the above-mentioned anode contains the silicon element in an organic compound.

In another preferable mode of the present invention, the above-mentioned silicon element is contained in the anode in the form of silicate ions.

In another preferable mode of the present invention, the silicon element is contained as a component in the above-mentioned zinc alloy.

It is particularly preferable that the above-mentioned gelled anode comprises a mercury-free zinc alloy powder containing at least one of 0.01–0.5 wt % bismuth, 0–0.5 wt % aluminum and 0.005–0.5 wt % calcium.

It is preferable that the zinc alloy powder further contains 0.01%–0.5 wt % indium.

While novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE PREFERRED EMBODIMENTS

Figure 1:
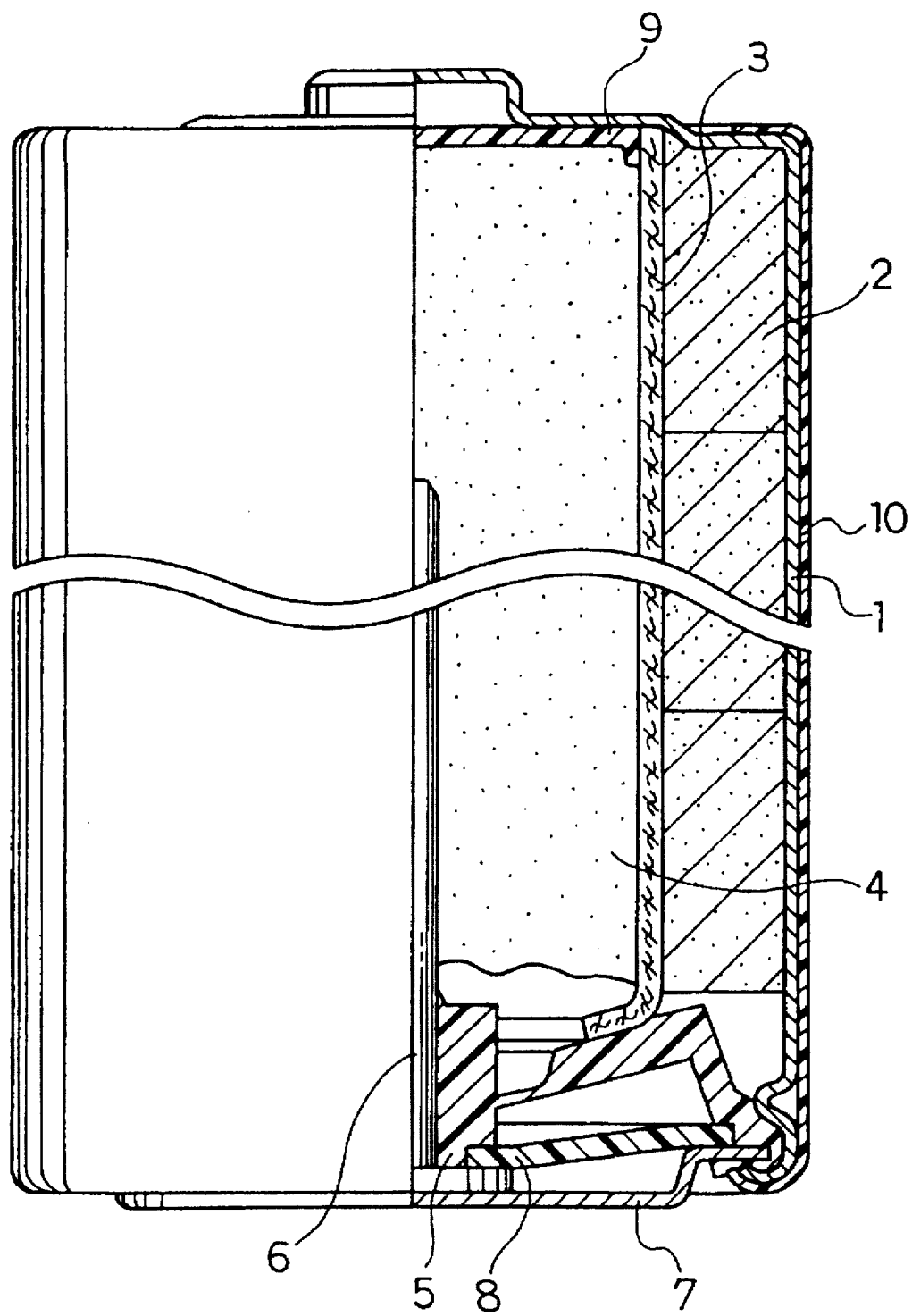
FIG. 1 is a front view of a partially sectioned cylindrical alkaline battery of Type LR6 (UM-3) in accordance with a preferred embodiment of the present invention.

The battery shown in FIG. 1 is prepared in the following manner. In a nickel-plated metal casing 1 which also serves as a cathode terminal, a plurality of cathode mixture pieces 2 molded into short annular cylinders are placed, and the combined body of the cathode mixture pieces 2 was pressed again in the metal casing 1. After a separator 3 and an insulating cap 9 are inserted into the center of the annular cathode mixture 2, a gelled zinc anode 4 is injected into the recess formed inside the separator 3.

Then, an anode current collector 6 combined with a resin sealing member 5, a bottom disk 7 which also serves as an anode terminal and an insulating washer 8, is inserted into the gelled zinc anode 4, and the open end of the metal casing 1 is roll-caulked for securing tight sealing of the battery. Thereafter, the surface of the metal casing 1 is covered with an exterior label 10 to obtain a single cell.

The gelled zinc anode 4 is prepared by mixing zinc oxide with an alkaline electrolyte of an aqueous solution containing 40 wt % potassium hydroxide, a gelling agent and a zinc powder twofold the weight of the electrolyte.

In the following paragraphs, specific examples of the batteries will be described.

EXAMPLE 1

BIC Zinc Alloy with Silicon in an Organic Compound

The cylindrical alkaline batteries of Type LR6 as shown in FIG. 1 were prepared by employing the gelled zinc anode comprising an anode active material of zinc alloy powder containing bismuth, indium and calcium, each 500 ppm by weight (hereinafter referred to as "BIC zinc") and a gelling agent of a water-soluble polyvinyl alcohol polymer containing silicon (available from KURARE Co. Ltd., under a tradename "R-polymer R-2130"). The amount of the gelling agent was stepwisely changed so as to adjust the concentration of silicon element in the anode to 25–3,000 ppm by weight of the zinc alloy powder as listed in Table 1 below.

As Comparative Example 1, another alkaline battery was prepared under the same conditions as in Example 1, except that a conventional gelling agent of polyvinyl alcohol free from silicon was used here.

These batteries were subjected to discharge tests to evaluate their discharge performances, that is, discharge durations at initial stage and at the time point after storing at 60° C. for one month, which is a proven temperature to cause a decrease in the discharge performance of conventional batteries. At testing, the batteries were loaded with a resistance of 3.9 Ω for 5 minutes per day, to make them intermittently discharge. Here, the discharge duration represents cumulative discharge hours until the battery voltage is lowered to the level of 1.0 V. Table 1 shows the results of the discharge tests.

TABLE 1

| Zinc alloy | Silicon element concentration (ppm by weight) | Discharge performance (Discharge duration: minute) | |
|---|---|---|---|
| | | Initial | After storing at 60° C. for one month |
| BIC zinc | 0 (Comparative Example 1) | 250 | 200 |
| | 25 | 292 | 278 |
| | 50 | 298 | 288 |
| | 100 | 300 | 290 |
| | 250 | 303 | 293 |
| | 500 | 303 | 293 |
| | 1000 | 297 | 281 |
| | 1500 | 288 | 279 |
| | 3000 | 267 | 258 |

As apparent from the results shown in Table 1, both of the initial discharge performances of the batteries and the discharge performances after storage for one month are greatly improved by adding the gelling agent containing silicon. In particular, the decreases in the discharge capacities after storage for one month are small, which proves a favorable storing property of the batteries.

Increased amount of silicon element in the anode exceeding 1,500 ppm by weight of the zinc alloy powder, however, has no effect on the discharge performance of the battery. Conversely, the discharge capacity decreases, as a result of which the maintenance voltage during discharge also decreases. It is therefore concluded that an excellent discharge performance can be obtained by adding the gelling agent so as to adjust the concentration of the silicon element in the anode to a range from 25 to 1,500 ppm by weight of the zinc alloy powder.

EXAMPLE 1A

Comparison with the other Zinc Alloys and Elementary Zinc

Next, the other cylindrical alkaline batteries were prepared by employing the gelled zinc anode comprising an anode active material selected from the group consisting of BIC zinc, another zinc alloy powder containing bismuth and calcium, each 500 ppm by weight (hereinafter referred to as "BC zinc"), and still another zinc alloy powder containing bismuth, indium and aluminum, each 500 ppm by weight (hereinafter referred to as "BIA zinc") as listed in Table 2 below, and the silicon-containing gelling agent. In this example the content of silicon element in the anode is fixed to 500 ppm by weight of the zinc alloy powder. In addition, another battery was prepared in a similar manner by employing an elementary zinc in place of the zinc alloys for the anode zinc powder of the gelled zinc anode.

These batteries were subjected to discharge tests to evaluate their discharge performances, that is, discharge durations at initial stage and at the time point after storing at 60° C. for one month. At testing, the batteries were loaded with a resistance of 3.9 Ω for 5 minutes per day, to make them intermittently discharge. Table 2 shows the discharge durations until the battery voltage decreases to the level of 1.0 V.

TABLE 2

| Zinc alloy | Silicon element concentration (ppm by weight) | Discharge performance (Discharge duration: minute) | |
|---|---|---|---|
| | | Initial | After storing at 60° C. for one month |
| BIC zinc | 500 | 303 | 293 |
| BC zinc | 500 | 304 | 294 |
| BIA zinc | 500 | 300 | 291 |
| Zinc powder | 500 | 302 | 278 |

As apparent from the results shown in Table 2, it is appreciated that the effect of different zinc alloy composition does not differ from the technical advantage obtained by the addition of the silicon-containing gelling agent.

The alkaline battery produced by employing a non-amalgamated zinc powder containing neither bismuth, aluminum, indium nor calcium as its anode active material also has favorable initial discharge performance. However, the discharge performance of such alkaline battery is greatly deteriorated after storage for one month because the corrosion-resistant property of the non-amalgamated zinc powder is inferior to that of the zinc alloys and thus the battery having such zinc powder cannot secure a favorable leakage-resistant property and has a danger of causing leakage of electrolyte. Therefore, the non-amalgamated zinc powder cannot be employed in an alkaline battery free from mercury.

EXAMPLE 2

BIC Zinc with Ionic Silicon

Another series of cylindrical alkaline batteries were prepared by employing the gelled zinc anode comprising an anode active material of the BIC zinc, a conventional gelling agent of polyvinyl alcohol polymer free from silicon and an aqueous solution of potassium silicate (available from TOKYO OHKA KOGYO Co. Ltd., under a tradename "OHKASEAL"). The concentration of silicon element in the anode was varied from 25 to 3,000 ppm by weight of the zinc alloy powder as listed in Table 3 below. Except for the above conditions, the procedures similar to those in Example 1 are generally followed.

As Comparative Example 2, another battery was prepared under the same conditions as in Example 2, except that an anode without containing an aqueous solution of potassium silicate was used here.

These batteries were subjected to discharge tests to evaluate their discharge performances, that is, discharge durations at initial stage and at the time point after storing at 60° C. for one month. At testing, the batteries were loaded with a resistance of 3.9 Ω for 5 minutes per day, to make them intermittently discharge. Table 3 shows the discharge durations until the battery voltage decreases to the level of 1.0 V.

TABLE 3

| Zinc alloy | Silicon element concentration (ppm by weight) | Discharge performance (Discharge duration: minute) | |
|---|---|---|---|
| | | Initial | After storing at 60° C. for one month |
| BIC zinc | 0 (Comparative Example 1) | 250 | 200 |
| | 25 | 295 | 280 |
| | 50 | 300 | 290 |
| | 100 | 303 | 290 |
| | 250 | 305 | 295 |
| | 500 | 305 | 295 |
| | 1000 | 295 | 283 |
| | 1500 | 290 | 280 |
| | 3000 | 270 | 260 |

As apparent from the results shown in Table 3, both of the initial discharge performances of the batteries and the discharge performances after storage for one month are greatly improved by employing the gelled zinc anode containing silicate ions. In particular, the decreases in the discharge performances due to the storing are small, and the batteries demonstrate a favorable discharge performance.

Increased amount of silicon element in the anode exceeding 1,500 ppm by weight of the zinc alloy powder, however, has no effect on the discharge performance of the battery. Conversely, the maintenance voltage during discharge decreases. It is therefore concluded that an alkaline battery having excellent discharge performance can be obtained by adding the silicate ions so as to adjust the content of the silicon element in the anode to a range from 25 to 1,500 ppm by weight of the zinc powder.

EXAMPLE 2A

Comparison with the other Zinc Alloys and Elementary Zinc

Next, the other cylindrical alkaline batteries were prepared by employing the gelled zinc anode comprising an anode active material selected from the group consisting of BIC zinc, BC zinc and BIA zinc, a conventional gelling agent and an aqueous solution of potassium silicate. In this example the content of silicon element in each of the anodes was fixed to 500 ppm by weight of the zinc alloy powder. In addition, another alkaline battery was prepared in a similar manner by employing an elementary zinc powder as an active material for the gelled zinc anode containing the silicate ions.

These batteries were subjected to discharge tests to evaluate their discharge performances, that is, discharge durations at initial stage and at the time point after storing at 60° C. for one month. At testing, the batteries were loaded with a resistance of 3.9 Ω for 5 minutes per day, to make them intermittently discharge.

TABLE 4

| Zinc alloy | Silicon element concentration (ppm by weight) | Discharge performance (Discharge duration: minute) | |
|---|---|---|---|
| | | Initial | After storing at 60° C. for one month |
| BIC zinc | 500 | 305 | 295 |
| BC zinc | 500 | 304 | 294 |
| BIA zinc | 500 | 303 | 293 |
| Zinc powder | 500 | 305 | 280 |

As apparent from the results shown in Table 4, it is appreciated that the effect of different zinc alloy composition does not differ from the technical advantage obtained by the addition of the potassium silicate aqueous solution.

The alkaline battery produced by employing an anode zinc powder containing neither bismuth, indium, aluminum nor calcium as its anode active material also has the favorable initial discharge performance. However, the corrosion-resistant property of the elementary zinc powder is inferior to that of the zinc alloys because the battery cannot secure a favorable leakage-resistant property of the zinc powder, and thus, the non-amalgamated zinc powder cannot be employed in an alkaline battery free from mercury.

EXAMPLE 2B

Comparison with the other Silicon Sources

The other cylindrical alkaline batteries were prepared by employing the gelled zinc anode comprising an anode active material of BIC zinc powder, and a silicon-containing material selected from the group consisting of potassium silicate powder, sodium silicate powder, silicon dioxide powder and silicic acid, respectively. In this example, the content of silicon element in the anode was fixed to 500 ppm by weight of the zinc alloy powder.

These batteries were subjected to discharge tests to evaluate their discharge performances, that is, discharge durations at initial stage and at the time point after storing at 60° C. for one month. At testing, the batteries were loaded with a resistance of 3.9 Ω for 5 minutes per day, to make them intermittently discharge. Table 5 shows the discharge durations until the battery voltage decreases to the level of 1.0 V.

TABLE 5

| Silicon composition | Silicon element concentration (ppm by weight) | Discharge performance (Discharge duration: minute) | |
|---|---|---|---|
| | | Initial | After storing at 60° C. for one month |
| Aqueous soln. of potassium silicate | 500 | 305 | 295 |
| Potassium silicate | 500 | 304 | 295 |
| Sodium silicate | 500 | 306 | 294 |
| Silicic acid | 500 | 304 | 296 |
| Silicon dioxide | 500 | 305 | 297 |

Any of the potassium silicate powder, sodium silicate power, silicon dioxide powder and silicic acid can give a similar technical advantage to that of the aqueous solution of potassium silicate.

Any of the silicon ion-containing substances of a silicate salt such as calcium silicate or magnesium silicate, and another silicon compound such as a silicon oxide other than the silicon dioxide or silicon nitride can give a similar technical advantage to that of the aqueous solution of potassium silicate.

EXAMPLE 3

Alloy Composition containing Silicon in various amounts

Another series of the cylindrical alkaline batteries were produced by first preparing alloy powders (particle diameter: 35–200 mesh) of the BIC zinc, added with 25 to 3,000 ppm by weight silicon stepwisely as listed in Table 6 below, and then employing these alloy powders with a conventional gelling agent for the gelled zinc anode. Except for the above conditions, the procedures similar to those in Example 1 are generally followed.

As Comparative Example 3, another battery was prepared under the same conditions as in Example 3, except that a BIC zinc containing no silicon was used as the zinc alloy powder.

These batteries were subjected to discharge tests to evaluate their discharge performances, that is, discharge durations at initial stage and at the time point after storing at 60° C. for one month. At testing, the batteries were loaded with a resistance of 3.9 Ω for 5 minutes per day, to make them intermittently discharge. Table 6 shows the discharge durations until the battery voltage decreases to the level of 1.0 V.

TABLE 6

| Zinc alloy composition (ppm by weight) | | | | Discharge performance (Discharge duration: minute) | |
|---|---|---|---|---|---|
| Bi | In | Ca | Si | Initial | After storing at 60° C. for one month |
| 500 | 500 | 500 | 0 | 250 | 200 |
| (Comparative Example 3) | | | | | |
| 500 | 500 | 500 | 25 | 293 | 282 |
| 500 | 500 | 500 | 50 | 299 | 288 |
| 500 | 500 | 500 | 100 | 303 | 293 |
| 500 | 500 | 500 | 250 | 310 | 298 |
| 500 | 500 | 500 | 500 | 312 | 299 |
| 500 | 500 | 500 | 1000 | 303 | 289 |
| 500 | 500 | 500 | 1500 | 298 | 286 |
| 500 | 500 | 500 | 3000 | 273 | 262 |

As apparent from the results shown in Table 6, both of the initial discharge performance of the batteries and the discharge performance after storage for one month are greatly improved by employing the non-amalgamated zinc alloy powder containing silicon as the anode active material for the gelled zinc anode. In particular, the decreases in the discharge performances due to the storing are small, and the batteries demonstrate a favorable storing property.

Increased amount of silicon in the anode zinc alloy powder exceeding 1,500 ppm by weight, however, has no effect on the discharge performance of the battery. Conversely, the maintenance voltage during discharge decreases. It is therefore concluded that an alkaline battery having an excellent discharge performance can be obtained by adjusting the silicon content in the zinc alloy to a range from 25 to 1,500 ppm.

EXAMPLE 3A

Comparison with the other Zinc Alloys

Next, the other cylindrical alkaline batteries were prepared by employing the gelled zinc anode comprising an anode active material selected from the group consisting of BIC zinc, BC zinc and BIA zinc, each containing silicon at 500 ppm by weight. Except for the above conditions, the procedures similar to those in Example 3 are generally followed. In addition, another alkaline battery was prepared in a similar manner by employing a zinc alloy containing only silicon in place of the other zinc alloys, for the anode zinc powder of the gelled zinc anode.

These batteries were subjected to discharge tests to evaluate their discharge performances, that is, discharge durations at initial stage and at the time point after storing at 60° C. for one month. At testing, the batteries were loaded with a resistance of 3.9 Ω for 5 minutes per day, to make them intermittently discharge. Table 7 shows the discharge durations until the battery voltage decreases to the level of 1.0 V.

TABLE 7

| Zinc alloy composition (ppm by weight) | | | | | Discharge performance (Discharge duration: minute) | |
|---|---|---|---|---|---|---|
| Bi | In | Ca | Al | Si | Initial | After storing at 60° C. for one month |
| 500 | 500 | 500 | 0 | 500 | 312 | 299 |
| 500 | 0 | 500 | 0 | 500 | 310 | 296 |
| 500 | 0 | 0 | 500 | 500 | 308 | 293 |
| 0 | 0 | 0 | 0 | 500 | 311 | 278 |

As apparent from the results shown in Table 7, it is appreciated that the effect of different zinc alloy composition containing components other than silicon does not differ from the technical advantage obtained by the addition of silicon.

The alkaline battery produced by employing the non-amalgamated zinc alloy containing only silicon as its anode zinc powder for the gelled zinc anode also has the favorable initial discharge performance. However, the corrosion-resistant property of the zinc powder is inferior to that of the other zinc alloys and the battery cannot secure a favorable leakage-resistant property, and thus, the non-amalgamated zinc alloy power containing only silicon cannot be employed in an alkaline battery free from mercury.

As shown above, a non-amalgamated zinc alloy powder containing at least one member selected from bismuth, aluminum, indium and calcium as an anode active material, formed in gelled zinc anode with a gelling agent, which contains the silicon element, regardless of its form, at a concentration of 25 to 1,500 ppm by weight of the zinc alloy powder is effective to prevent short-circuiting between the anode and cathode due to formation of zinc oxide, as a result of which the alkaline battery can have improved discharge performance.

According to the present invention, it is possible to provide an alkaline battery having a large discharge capacity and an excellent storing property.

It is understood that various other modifications and alterations will be apparent to and can be readily made by those skilled in the art without departing from the true scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An alkaline battery comprising: a cathode mixture; a gelled zinc anode which comprises a mercury free zinc alloy powder and a gelling agent; an anode current collector; a separator between said cathode and anode; and an alkaline electrolyte, said zinc alloy powder containing aluminum or calcium, wherein said gelled anode further comprises silicon in the form of an organic compound or a silicate ion.

2. The alkaline battery in accordance with claim 1, wherein said zinc alloy powder further contains Indium.

3. The alkaline battery in accordance with claim 1, wherein the content of silicon in said anode is 25–1,500 ppm by weight of said zinc alloy powder.

4. An alkaline battery comprising: a cathode mixture; a gelled zinc anode which comprises a mercury free zinc alloy powder and a gelling agent; an anode current collector; a separator between said cathode and anode; and an alkaline electrolyte, said zinc alloy powder containing bismuth and calcium, wherein said gelled anode further comprises silicon in the form of an organic compound or a silicate ion.

* * * * *